(12) United States Patent
Kim et al.

(10) Patent No.: US 9,941,026 B2
(45) Date of Patent: Apr. 10, 2018

(54) GLASS COMPOSITION FOR VITRIFYING LOW-LEVEL RADIOACTIVE WASTE RESIN

(71) Applicant: KOREA HYDRO & NUCLEAR POWER CO., LTD., Gyeongju-si, Gyeongsangbuk-do (KR)

(72) Inventors: Deuk Man Kim, Daejeon (KR); Byung Kwan Lee, Daejeon (KR); Cheon Woo Kim, Daejeon (KR)

(73) Assignee: Korea Hydro & Nuclear Power Co., Ltd., Gyeongju-si, Gyeongsangbuk-do ( * ) Notice: Subject to any disclaimer, the term of this patent is extended or adjusted under 35 U.S.C. 154(b) by 0 days.

(21) Appl. No.: 15/101,564

(22) PCT Filed: Dec. 30, 2013

(86) PCT No.: PCT/KR2013/012382
§ 371 (c)(1),
(2) Date: Jun. 3, 2016

(87) PCT Pub. No.: WO2015/083886
PCT Pub. Date: Jun. 11, 2015

(65) Prior Publication Data
US 2017/0032859 A1    Feb. 2, 2017

(30) Foreign Application Priority Data

Dec. 4, 2013 (KR) .................. 10-2013-0150223

(51) Int. Cl.
*G21F 9/30* (2006.01)
*C03C 3/064* (2006.01)
*C03C 1/00* (2006.01)

(52) U.S. Cl.
CPC .............. *G21F 9/301* (2013.01); *C03C 1/002* (2013.01); *C03C 3/064* (2013.01); *G21F 9/305* (2013.01); *G21Y 2002/60* (2013.01); *G21Y 2004/10* (2013.01)

(58) Field of Classification Search
CPC . G21F 9/30; G21F 9/301; G21F 9/305; C03C 1/002; C03C 3/064

USPC .......................................................... 588/11
See application file for complete search history.

(56) References Cited

U.S. PATENT DOCUMENTS

| 7,019,189 | B1 | 3/2006 | Chekhmir et al. |
| 7,550,645 | B2 | 6/2009 | Chekhmir et al. |
| 7,825,288 | B2 | 11/2010 | Chekhmir et al. |
| 8,530,718 | B2 | 9/2013 | Yamazaki et al. |
| 2006/0189471 | A1 | 8/2006 | Chekhmir et al. |
| 2010/0022380 | A1 | 1/2010 | Chekhmir et al. |
| 2010/0285945 | A1 | 11/2010 | Yamazaki et al. |
| 2011/0306486 | A1 | 12/2011 | Dussossoy et al. |
| 2014/0066684 | A1 | 3/2014 | Yamazaki et al. |

FOREIGN PATENT DOCUMENTS

| CN | 102272859 A | 11/2011 |
| JP | 11-258389 A | 9/1999 |
| JP | 2007-527005 A | 9/2007 |
| JP | 2009-074919 A | 4/2009 |
| KR | 10-2004-0018856 A | 3/2004 |
| KR | 10-0432450 B1 | 5/2004 |
| KR | 10-0768093 B1 | 10/2007 |
| KR | 10-2011-0099785 A | 9/2011 |
| WO | WO 2010/076288 A2 | 7/2010 |

OTHER PUBLICATIONS

Japanese Office Action dated Jun. 27, 2017.
Chinese Office Action dated Sep. 28, 2017.

*Primary Examiner* — Edward Johnson
(74) *Attorney, Agent, or Firm* — Rabin & Berdo, P.C.

(57) ABSTRACT

This invention relates to the vitrification of radioactive waste products. According to this invention, a glass composition, which is suitable for low-level radioactive waste resins, and a method of vitrifying the low-level radioactive waste resins using the same are provided to significantly reduce the volume of radioactive waste products and to vitrify low-level radioactive waste products using the glass composition, which is suitable for vitrifying the low-level radioactive waste resins, thereby maximally delaying or completely preventing the leakage of radioactive materials from a glass solidified body.

1 Claim, 7 Drawing Sheets

GLASS COMPOSITION FOR VITRIFYING LOW-LEVEL RADIOACTIVE WASTE RESIN

TECHNICAL FIELD

The present invention relates, in general, to the vitrification of radioactive waste products and, more particularly, to a glass composition, which is suitable for low-level radioactive waste resins, and a method of vitrifying the low-level radioactive waste resins using the same.

BACKGROUND ART

Low-level radioactive waste resins, which are radioactive waste products discharged from a nuclear power plant, are treated by being encased in cement or contained in a waste drum. There is demand for a technology of manufacturing a solidified body, from which radioactive materials do not leak, or leak into underground water at a much slower rate compared to a cement-solidified body, when the solidified body comes into contact with underground water, and another technology of significantly reducing the number of radioactive waste drums so that a waste disposal site may be used over a long period of time, in consideration of the fact that it is becoming difficult to build waste disposal sites.

Recently, various countries have actively made research into technologies for vitrifying radioactive waste products using glass media to meet this demand.

Meanwhile, examples of the related art regarding a process of vitrifying radioactive waste products include Korean Patent No. 10-0768093 (a method of vitrifying middle- and low-level radioactive waste products using iron/phosphate glass) and Korean Patent No. 10-0432450 (a system for treating middle- and low-level radioactive waste products). However, since the middle- and low-level radioactive waste products are different from high-level waste products in terms of the type, production amount, and chemical composition thereof, the technology for vitrifying high-level waste products is not capable of being applied to middle- and low-level radioactive waste products without any modification, and, regardless, a glass composition for vitrifying low-level radioactive waste resins is not disclosed in the patents.

DISCLOSURE

Technical Problem

Accordingly, the present invention has been made keeping in mind the above problems occurring in the related art, and an object of the present invention is to provide a glass composition which is most suitable for vitrifying low-level radioactive waste resins.

Another object of the present invention is to provide a method of vitrifying low-level radioactive waste resins using a glass composition for use in the low-level radioactive waste resins.

Technical Solution

In order to accomplish the above objects, the present invention provides a glass composition for vitrifying a low-level radioactive waste resin, the glass composition including $SiO_2$, $Al_2O_3$, $B_2O_3$, CaO, $K_2O$, MgO, $Na_2O$, and $Li_2O$.

The glass composition may further include $MnO_2$.

The glass composition includes 30 to 40 wt % of $SiO_2$, 6 to 9 wt % of $Al_2O_3$, 9 to 13 wt % of $B_2O_3$, 15 to 22 wt % of CaO, 7 to 9 wt % of $K_2O$, 2 to 5 wt % of MgO, 4 to 9 wt % of $Na_2O$, and 3 to 7 wt % of $Li_2O$. When the glass composition further includes $MnO_2$, the glass composition includes 30 to 40 wt % of $SiO_2$, 6 to 9 wt % of $Al_2O_3$, 9 to 13 wt % of $B_2O_3$, 15 to 22 wt % of CaO, 7 to 9 wt % of $K_2O$, 2 to 5 wt % of MgO, 4 to 9 wt % of $Na_2O$, 3 to 7 wt % of $Li_2O$, and 0.5 to 3 wt % of $MnO_2$.

In order to accomplish the above objects, the present invention also provides a method of vitrifying a low-level radioactive waste resin, the method including adding the low-level radioactive waste resin and a glass composition including $SiO_2$, $Al_2O_3$, $B_2O_3$, CaO, $K_2O$, MgO, $Na_2O$, and $Li_2O$, together to a melting furnace.

The glass composition may further include $MnO_2$.

The glass composition includes 30 to 40 wt % of $SiO_2$, 6 to 9 wt % of $Al_2O_3$, 9 to 13 wt % of $B_2O_3$, 15 to 22 wt % of CaO, 7 to 9 wt % of $K_2O$, 2 to 5 wt % of MgO, 4 to 9 wt % of $Na_2O$, and 4.57 wt % of $Li_2O$. When the glass composition further includes $MnO_2$, the glass composition includes 30 to 40 wt % of $SiO_2$, 6 to 9 wt % of $Al_2O_3$, 9 to 13 wt % of $B_2O_3$, 15 to 22 wt % of CaO, 7 to 9 wt % of $K_2O$, 2 to 5 wt % of MgO, 4 to 9 wt % of $Na_2O$, 4.57 wt % of $Li_2O$, and 0.5 to 3 wt % of $MnO_2$.

Advantageous Effects

According to the present invention, a glass composition, which is suitable for low-level radioactive waste resins, and a method of vitrifying the low-level radioactive waste resins using the same are provided to significantly reduce the volume of radioactive waste products and to vitrify low-level radioactive waste products using the glass composition, which is suitable for vitrifying the low-level radioactive waste resins, thereby maximally delaying or completely preventing the leakage of radioactive materials from a glass solidified body.

BEST MODE

Figure 1:
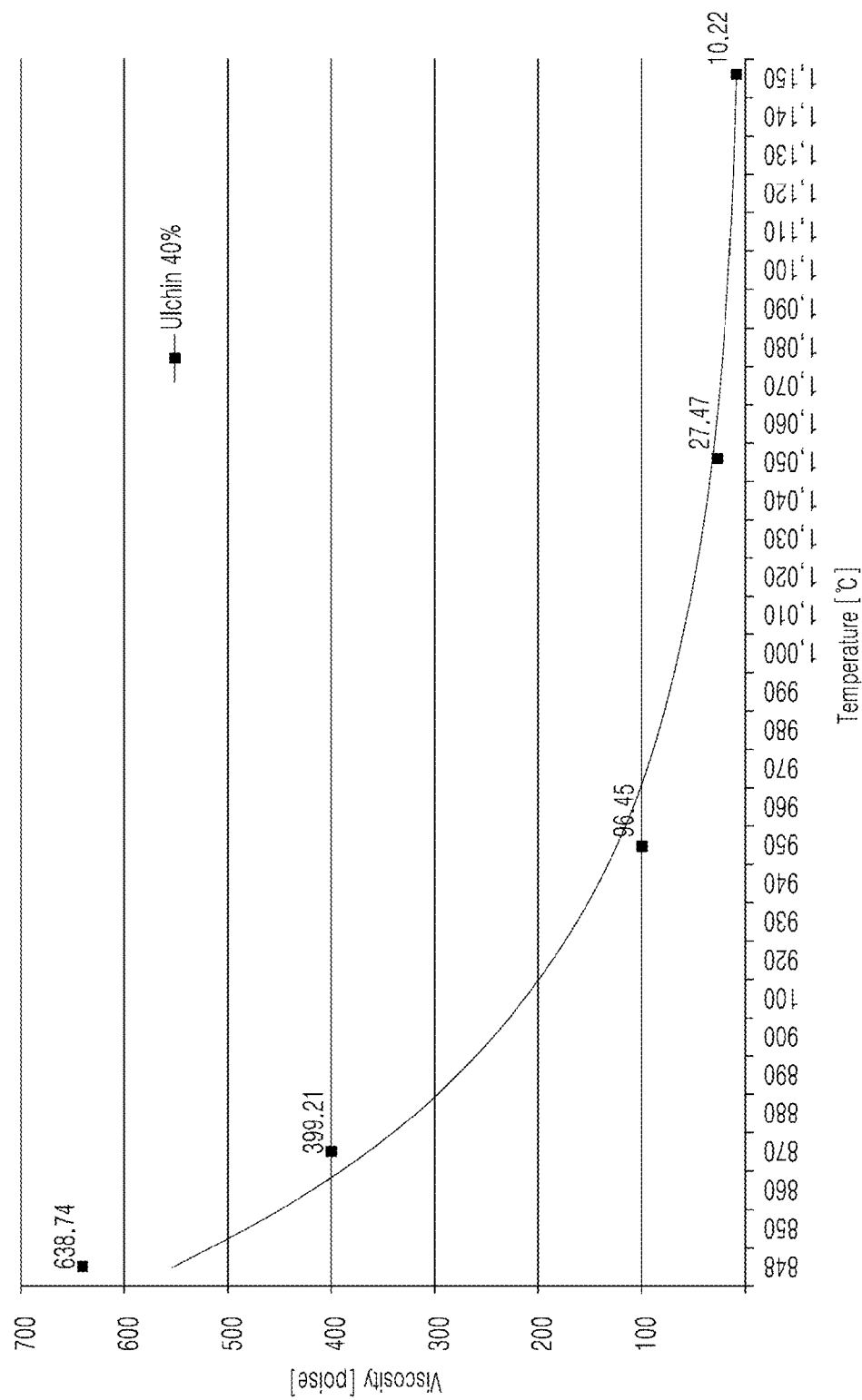
FIG. 1 shows the result of measurement of the viscosity of candidate glass according to Example 2.

A better understanding of the present invention may be obtained through the following Examples. It will be obvious to those skilled in the art that the Examples are set forth to illustrate the present invention but are not to be construed to limit the scope of the present invention.

Example 1. Composition Analysis (1) Extent of Production

Low-level radioactive waste resins have been produced from a nuclear power plant in an amount of about 9 tons per a year and have been mixed with flammable dry active waste to be vitrified. Efforts have been continuously made to reduce the amount of flammable dry active waste, and accordingly, the production amount thereof has been gradually reduced in practice, but the amount of low-level radioactive waste resin that is produced has not been significantly reduced. Therefore, there is a need to develop a novel glass composition for vitrifying only low-level radioactive waste resin, which is produced in a large amount. The glass composition depends on the chemical composition and the concentration of the low-level radioactive waste resin. Accordingly, in order to precisely analyze the chemical composition, the low-level radioactive waste resin, which was produced from the nuclear power plant, was sampled for analysis as follows.

(2) Analysis Method

In order to analyze the chemical composition of the low-level radioactive waste resin, the dissolving condition of each sample was set using a closed-vessel microwave acid digestion system, and the content of inorganic substances was then analyzed. In order to perform analysis, about 5 g of each sample (a total of four samples) was sampled from a low-level radioactive waste resin drum and dried at 105° C. for 5 hrs, nitric acid, hydrochloric acid, and distilled water were mixed for elution, and the components were analyzed using an ICPAES (inductively coupled plasma atomic emission spectroscope, Thermo Jarrell Ash, IRIS-HR).

The simulated waste resin, which was used during the pilot test of the low-level radioactive waste resin, was analyzed using a method similar to that used for actual waste products. One sample was used to manufacture four elution solutions in order to increase the reliability of analysis. Among the samples, the two samples were eluted with the nitric acid and the hydrochloric acid using the microwave digestion system, and the two remaining samples were eluted with a mixed acid including the nitric acid, the hydrochloric acid, and the hydrofluoric acid using the microwave digestion system. The device that was used was an ICP-AES (Spectro Ciros Vision). The low-level radioactive waste resin was dissolved in the acid in order to analyze the chemical components thereof. However, the resin was not completely dissolved due to the characteristics thereof. However, it is judged that the remaining undissolved resin insignificantly affected the glass composition in consideration of the chemical composition analysis table of the resin manufacturer (50 ppm or less of Al, Ca, Cu, Fe, and the like on a dry basis). The analysis method of the chemical components is summarized and described below.

i) Low-Level Radioactive Waste Resin (Actual Waste Product)

Sample amount: about 5 g
Acid for use in dissolving: 70% $HNO_3$ and 37% hydrochloric acid (HCl)
Low-temperature heating before the microwave digestion system is used
The single use of the microwave digestion system
Chemical component analysis using ICP-AES ii) Simulated Waste Product
Sample amount: about 5 g
Acid for use in dissolving

| Primary | 70% $HNO_3$ and 37% hydrochloric acid (HCl) |
| Secondary | 70% $HNO_3$, 37% hydrochloric acid (HCl), and 48% hydrofluoric acid (HF) |

Low-temperature heating before the microwave digestion system is used
The single use of the microwave digestion system
Chemical component analysis using ICP-AES (3) Analysis Result The analysis result of the main inorganic substances of the low-level radioactive waste resin is summarized in Table 1, and is compared to that of the simulated waste resin used during the pilot test.

TABLE 1

Comparison of concentrations of inorganic substances of low-level radioactive waste resin and simulated waste resin (wt %)

| Waste product from nuclear power plant | Concentration of actual waste product | Concentration of simulated waste resin |
|---|---|---|
| Mixed waste resin | Inorganic substance; 1.28<br>Ca, K; 62.3<br>Cu, Fe; 13.8 | Inorganic substance; 0.45<br>Ca, K; 59.47<br>Cu, Fe; 18.00 |

It was analyzed that alkali earth metal (Ca) and alkali (K), which reduced the viscosity and the resistance of molten glass, were present in an amount of about 62.3 wt % and occupied the majority of the resin, the content of transition metal (Fe and Cu), which caused the generation of precipitates on the bottom of the melting furnace during treatment, was 13.8 wt %, and the content of the glass former (Al) for use in formation of the structure of the glass was about 7 wt %, based on normalization of the result of analysis of the low-level radioactive waste resin (100 wt %). It was analyzed that the content of Mn, among other transition metals, was not high, namely about 1.0 wt %. Other components were present in amounts of less than 5 wt %, and were judged to insignificantly affect the glass composition and the process.

Example 2. Development of Candidate Glass
(Simulation of Glass Composition)

Among various kinds of glass, borosilicate glass, which is most frequently used to vitrify radioactive waste products, was applied to develop the glass composition suitable for the low-level radioactive waste resin. Borosilicate glass contains at least 5% or more of boric acid. Because the boric acid is added, the expansion coefficient is reduced, increasing chemical resistance, particularly acid resistance/weatherability, and imparting excellent heat impact resistance. The chemical composition of the glass composition suitable for the low-level radioactive waste resin was controlled to perform simulation of 40% waste loading. As for the control of the chemical composition, the content of $SiO_2$, $B_2O_3$, and $Al_2O_3$, which were the glass former, was controlled to about 52 to 55 wt %, and the content of $LiO_2$ and $Na_2O_3$ was controlled to 8 to 9 wt % in order to adjust electric conductivity. The result of simulation of the glass composition is set forth in Table 2.

TABLE 2

Result of simulation of development of glass composition

| Oxides | SG (wt %) | SG-F (wt %) |
|---|---|---|
| $Al_2O_3$ | 7.91 | 7.50 |
| $B_2O_3$ | 11.38 | 15.00 |
| CaO | 19.46 | — |
| $K_2O$ | 7.85 | — |
| $Li_2O$ | 5.51 | 7.51 |
| MgO | 2.39 | — |
| $MnO_2$ | 0.35 | — |
| $Na_2O$ | 4.84 | 7.50 |
| $SiO_2$ | 40.31 | 62.49 |
| Sum | 100 | 100 |
| Density (kg/L) | 2.78 | 2.83 |
| Viscosity (Poise)@1,150° C. | 4 | 86 |
| EC (S/cm)@1,150° C. | 0.41 | 0.35 |
| Leaching rate (PCT) Si (g/m$^2$) | 0.25 | 0.38 |
| B (g/m$^2$) | 0.66 | 1.23 |
| Li (g/m$^2$) | 0.91 | 1.31 |
| Na (g/m$^2$) | 1.63 | 0.69 |

Experimental Example 1. Test of Physical/Chemical Properties

The viscosity and the electric conductivity of candidate glass of Example 2 were measured, and physical/chemical properties thereof, including surface homogeneity, the leaching property, the liquidus temperature, and compressive strength, were tested.

(1) Measurement of Viscosity

The viscosity of molten glass was measured using a DV-II Pro viscometer manufactured by Brookfield, Ltd. in the USA. The viscometer was calibrated using a standard viscous material (4,900 to 103,040 cp) at room temperature. After the temperature of the electric furnace was increased to 1,150° C., glass was put into an alumina crucible having an inner diameter of 28 mm to be melted, the measurement temperature was changed from 850 to 1,150° C. in increments of 50° C., and stabilization was performed for 30 min to measure the viscosity. The spindle that was used included an alumina material and had an outer diameter of 10 mm. The torque value, which was generated when the spindle was provided to molten glass to thus be rotated at a predetermined number of rotation, was ensured to be converted into the viscosity. The viscosity values, which were measured at temperatures in the range of 800 to 1,250° C., were used to calculate viscosity values outside the designated range using a Vogel-Fulcher-Tammann (VFT) equation (ln η=A/(T−To)+B, in which A, B, and To were fitting factors). When the viscosity value is more than a reference value, it is not easy to discharge molten glass through the lower portion of the low-temperature melting furnace and it is difficult to mix the molten glass and waste products. On the other hand, when the viscosity value is very low, it is easy to discharge the glass and to mix the glass and the waste products, but the low value may affect the corrosion of metal sectors, and accordingly, the viscosity value must be maintained at 10 to 100 poise. As a result of measurement, the viscosity value was 10.22 poise at 1,150° C., which was the operating temperature of the low-temperature melting furnace, as shown in FIG. 1, and it was evaluated that there was no problem in discharging of the glass.

(2) Measurement of Electric Conductivity

Figure 2:
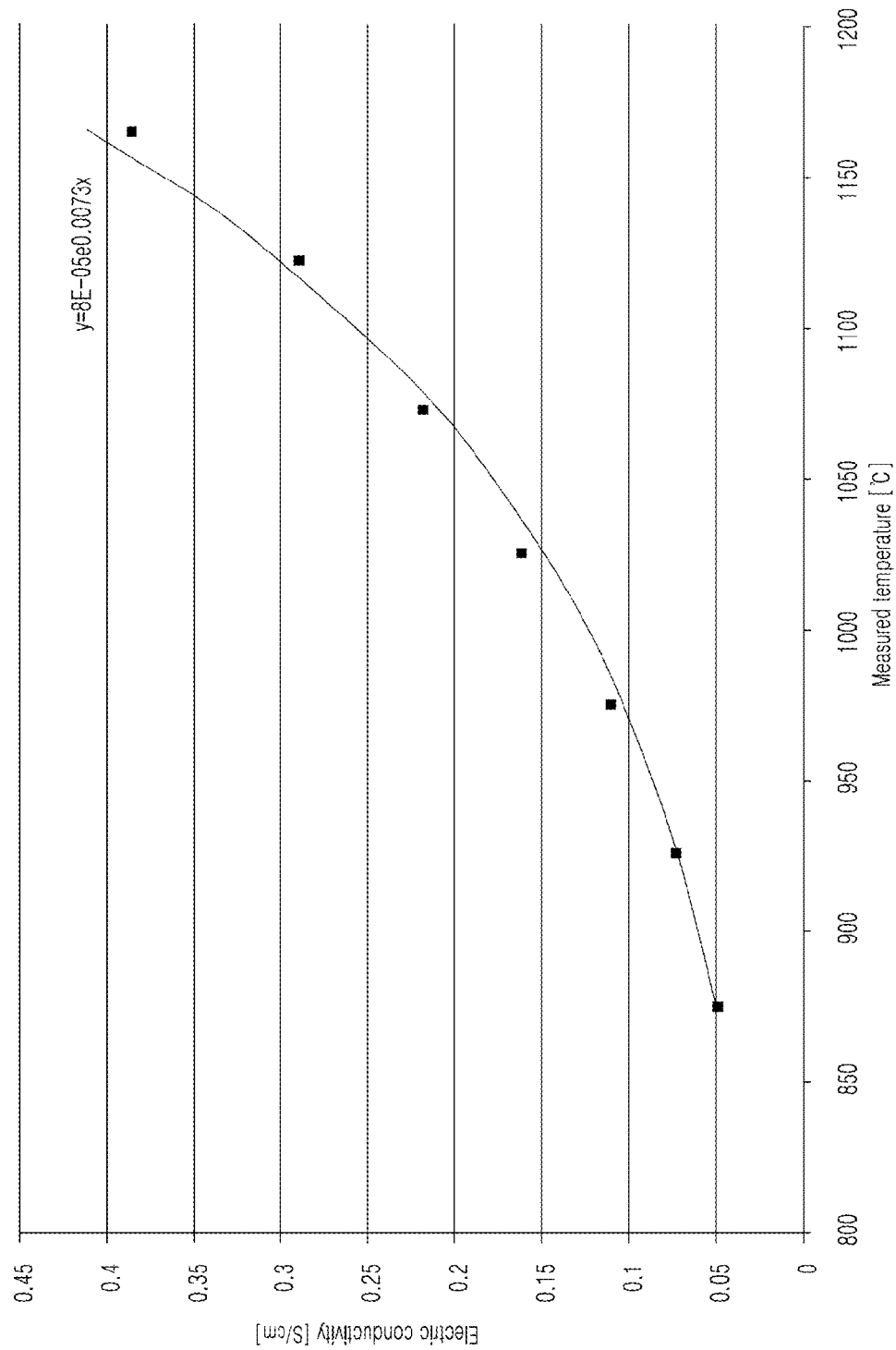
FIG. 2 is a graph showing the measured electric conductivity of candidate glass according to Example 2.

After the temperature of the electric furnace was increased to 1,150° C., glass was put into an alumina crucible having an inner diameter of 45 mm to be melted, the measurement temperature was changed from 850 to 1,150° C. in increments of 50° C., and stabilization was performed for 30 min to measure the electric conductivity. Two electrodes were used. Pt—Rh (10%) electrodes were fixed at an interval of 15 mm and inserted into the molten glass to a depth of 10 mm to measure the electric conductivity. The electric conductivity was measured using an LCR meter (Agilent, USA) of 1 kHz and 10 mA. The electric conductivity values measured at a temperature in the range of 850 to 1,150° C. are shown in Table 3 and FIG. 2. The electric conductivity of the candidate glass was 0.1 S/cm or more at 1,000° C. or higher when measured, as shown in the graph of FIG. 2, and accordingly, the candidate glass satisfied the reference value of the electric conductivity.

TABLE 3

Measured values of electric conductivity of candidate glass

| Candidate glass | Temperature (° C.) | Electric conductivity σ (S/cm) |
|---|---|---|
| SG | 1150 | 0.35 |
|  | 1100 | 0.24 |
|  | 1050 | 0.17 |
|  | 1000 | 0.11 |
|  | 950 | 0.08 |
|  | 900 | 0.05 |
|  | 850 | 0.04 |

In order to stably vitrify the waste product in a CCIM, the viscosity and the electric conductivity of the molten glass among process variables should satisfy the range of 10 to 100 poise and the range of 0.1 to 1.0 S/cm, respectively. The viscosity and the electric conductivity of the developed molten glass satisfied all requirements. From Table 4, it was confirmed that the value calculated using GlassForm 1.1 computer code and the value that was actually measured in the laboratory were relatively similar to each other at 1,150° C., at which the vitrification process was performed.

TABLE 4

Comparison of viscosity and electric conductivity, calculated using computer code (GlassForm 1.1), and viscosity and electric conductivity, measured in laboratory (temperature; 1,150° C.)

| Classification | Viscosity (dPa · s = poise) | | Electric conductivity (S/cm) | |
|---|---|---|---|---|
| | Calculated value | Experimental value | Calculated value | Experimental value |
| Candidate glass | 4 | 10.2 | 0.4 | 0.35 |

(3) Surface Homogeneity

Figure 3:
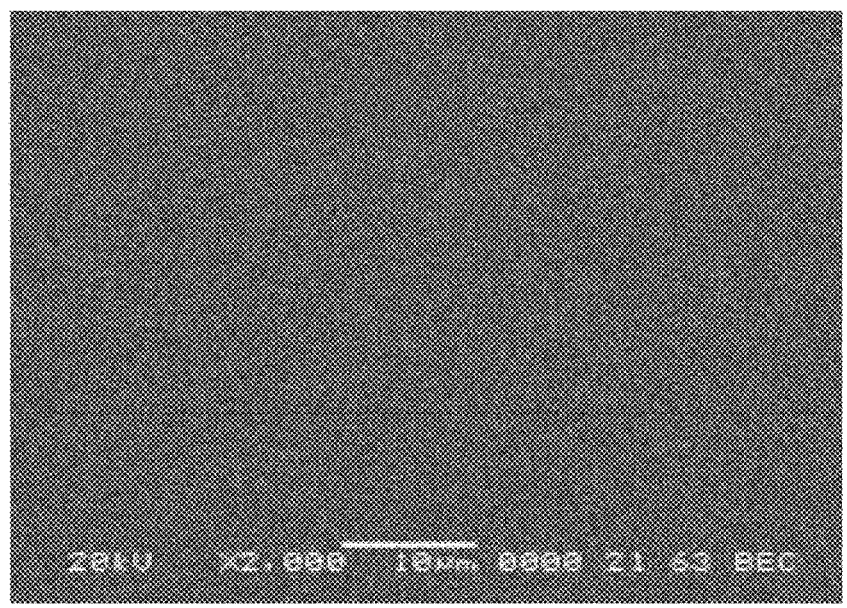
FIG. 3 shows a SEM image of the solidified body of candidate glass according to Example 2.

In order to evaluate the surface homogeneity of the glass solidified body, the surface was observed using a scanning electron microscope (SEM). First, the sample was uniformly ground in a sample grinder. Subsequently, an electron beam was radiated on the surface of the sample using a tungsten filament electron gun to detect secondary electrons and backscatter electrons on the surface of the sample, thus performing imaging of the surface of the glass solidified body. It was analyzed that the surface of the solidified body of the candidate glass, which was manufactured in Example 2, exhibited homogeneity, as shown in FIG. 3.

(4) Leaching Characteristic i) Leaching Test Method

Melting of Glass

In order to experimentally evaluate the quality of the candidate glass, chemicals (raw chemicals) were used to form a glass batch of about 600 g. The amount of the chemicals that was used was controlled based on the purity of the chemicals provided by the manufacturers, and chemicals having purity of 98% or more were used. The chemicals for use in the glass composition were $Al_2O_3$, $B_2O_3$, $CaCO_3$, and $Fe_2O_3$. The chemical batches, which were manufactured to match the composition of the candidate glass, were uniformly mixed in a plastic vessel, transferred to a clay crucible to be heated to 1,150° C. using a $MoSi_2$ heating unit electric furnace, maintained at 1,150° C. for 45 min, and pulled. The resulting substance was homogeneously mixed with molten glass using a quartz rod, put back into the electric furnace to be melted at 1,150° for 15 min, and poured on a graphite mold to be cooled. The cooled glass samples were used for the purpose of each test.

PCT (Product Consistency Test)

The US DOE PCT (product consistency test) as a test for measuring the chemical durability of the glass solidified body is a test for comparing leaching behavior of the elements in the glass solidified body for at least 7 days or over a long period of time (hundreds of days) to leaching behavior of the benchmark glass. The minimum test duration was 7 days, and the EA (Environmental Assessment) glass, which was manufactured by the Savannah River National Laboratory in the USA, was used for the purpose of comparison and review with respect to the candidate glass that was used. The leaching rate of the elements, leaching from the glass solidified body, was compared to the leaching rates of the glass solidified body from Uljin vitrification equipment and the SRL-EA benchmark glass. An ICP-AES was used to analyze the concentration of the components that were dissolved and discharged after the leaching test.

ii) Result of Leaching Test

Figure 4:
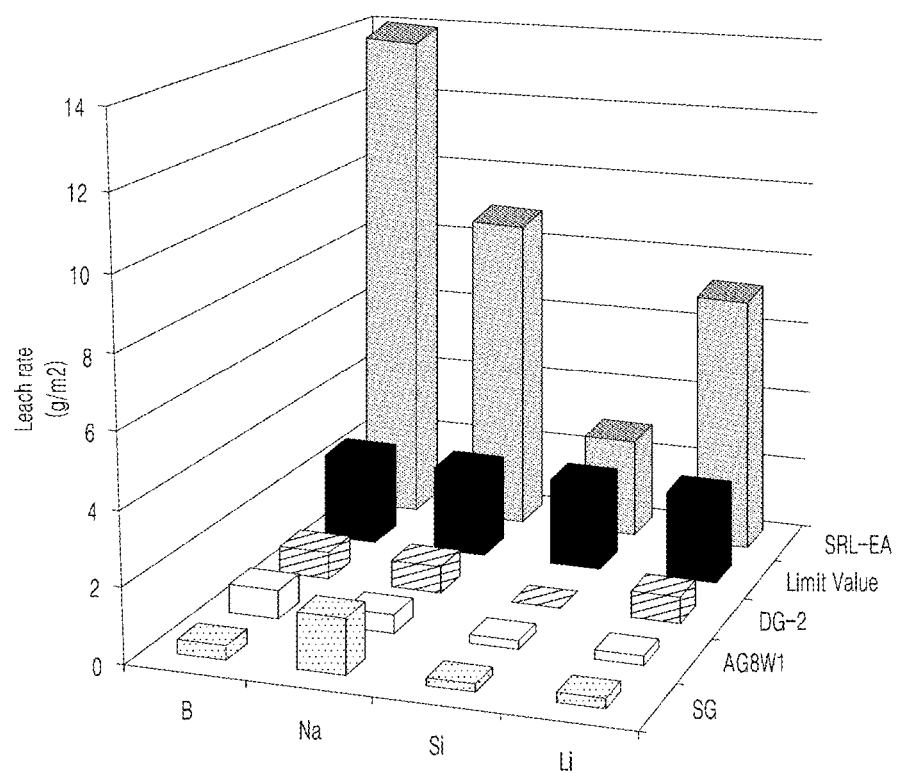
FIG. 4 is a comparative graph showing the leaching rates of the glass solidified bodies.

The candidate glass was subjected to PCT for 7 days, and the result is shown in FIG. 4. The candidate glass satisfied the leaching reference value of the glass solidified body from Uljin vitrification equipment, and had a leaching rate that was lower than that of the SRL-EA benchmark glass, thereby exhibiting excellent chemical stability.

(5) Liquidus Temperature

Figure 5:
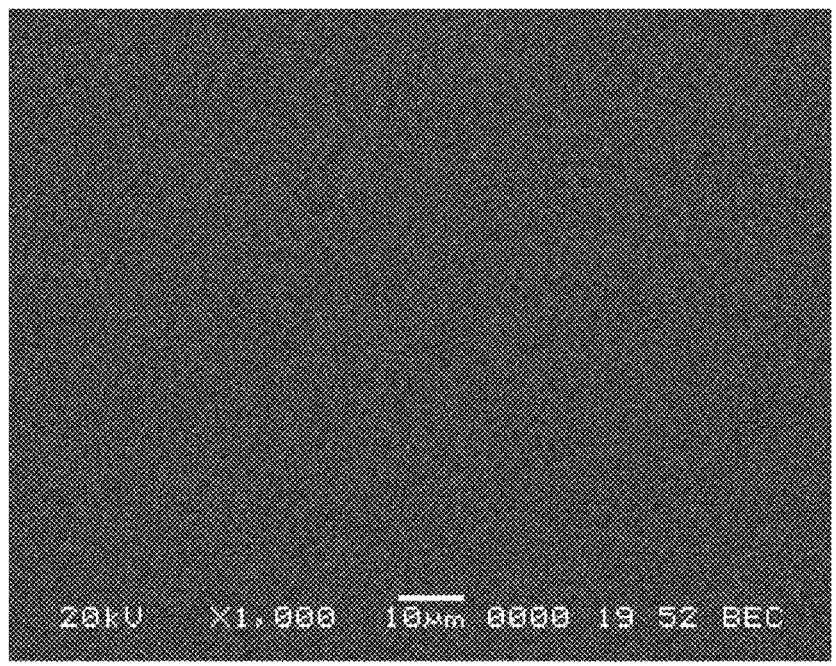
FIG. 5 shows a SEM analysis image of the surface of the glass solidified body after heat treatment (950° C./20 hr)

When the glass is melted over a long period of time, it is very important to maintain the glass at the liquidus temperature or higher in order to prevent crystals from being formed. When the homogeneous molten glass is formed at the melting temperature, normal production of the glass and long-term operation are feasible. On the other hand, when a crystal phase is formed, precipitation may occur, eventually clogging a glass outlet and possibly affecting the chemical robustness of the glass, that is, leachability. It is empirically known that the difference between the temperature of a melting state and the liquidus temperature of glass is preferably more than 100° C. Analysis was performed using a polarizing microscope in order to measure the liquidus temperature, but it was difficult for light to penetrate the manufactured sample, and accordingly, it could not be confirmed whether or not crystals were present. Therefore, an analysis process for confirming the presence of crystals on the surface of the glass sample using a SEM was applied to evaluate the liquidus temperature. From the result of SEM analysis shown in FIG. 5, it was confirmed that when the candidate glass was subjected to heat treatment at 950° C. for 20 hr, crystals were not formed at a meniscus and not at the boundary of a crucible. The minimum temperature at which the crystals were not formed, determined from the result of a heat-treatment test conducted for 20 hr, was defined as the liquidus temperature of the glass. From the result of the test, the liquidus temperature of the candidate glass was estimated to be 950° C. or less. Therefore, it was judged that there was no possibility of the molten glass being converted into crystals during the long-term vitrification process.

(6) Compressive Strength

A compressive strength test is a test for confirming the integrity of the solidified body by applying a physical load to the manufactured sample, and test procedures and applied standards are different in different countries. The compressive strength test includes compressive strength as a test item, and is a test which is performed after a heat circulation test, a water immersion test, and an irradiation test to thus confirm the physical durability of the solidified body. As for the test procedure, a sample is put on a test board, a load value when the sample is broken is measured while a load is applied at a constant rate, and this value is applied to calculate compressive strength. The physical integrity of the glass solidified body must be maintained when the glass solidified body is transported, stored, and disposed in a waste disposal site. Therefore, the reference value of compressive strength is regulated to 35.2 kg/cm$^2$ (500 psi) or more in the case of the hard solidified body according to an acceptance standard of the waste disposal site. The compressive strength test is performed until the sample is broken by constantly applying a load to the sample in a vertical axis direction. The applied rate is based on a loading rate regulated in KS F2405, and the compressive strength of the sample is calculated by dividing the maximum load, which is obtained from the test, by the cross-sectional area of the sample. The candidate glass, which was manufactured in Example 2, was cooled from a transition temperature (498° C.) at a rate of about 2.7° C. per minute to measure the compressive strength. As a result of the measurement, the compressive strength was measured to be 500 psi or more and was evaluated to satisfy the reference.

(7) Conclusion

The measured values of the viscosity and the electric conductivity of the candidate glass, which were important properties for the operation of a low-temperature melting furnace, satisfied the reference values, and the liquidus temperature was 950° C. or less, which was similar to that of the conventionally developed glass. As a result of the leaching test, the leaching rate of the glass solidified body was less than 2 g/m$^2$, which was the limit value, when measured, and accordingly, it was judged that the developed candidate glass was capable of being applied to a pilot test.

Figure 6:
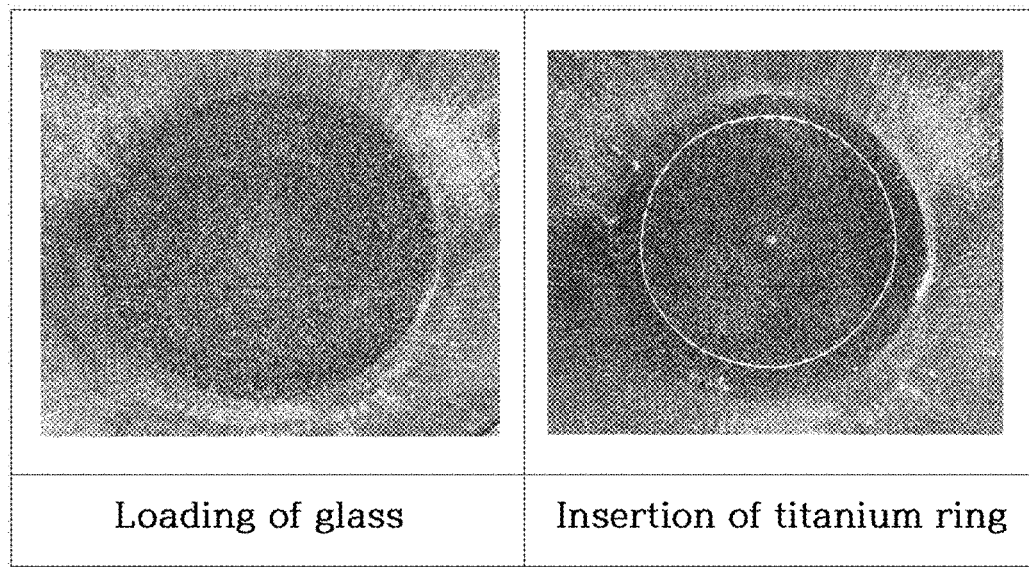
FIG. 6 is a picture showing glass and a titanium ring loaded in an induction-heating low-temperature melting furnace.
Figure 7:
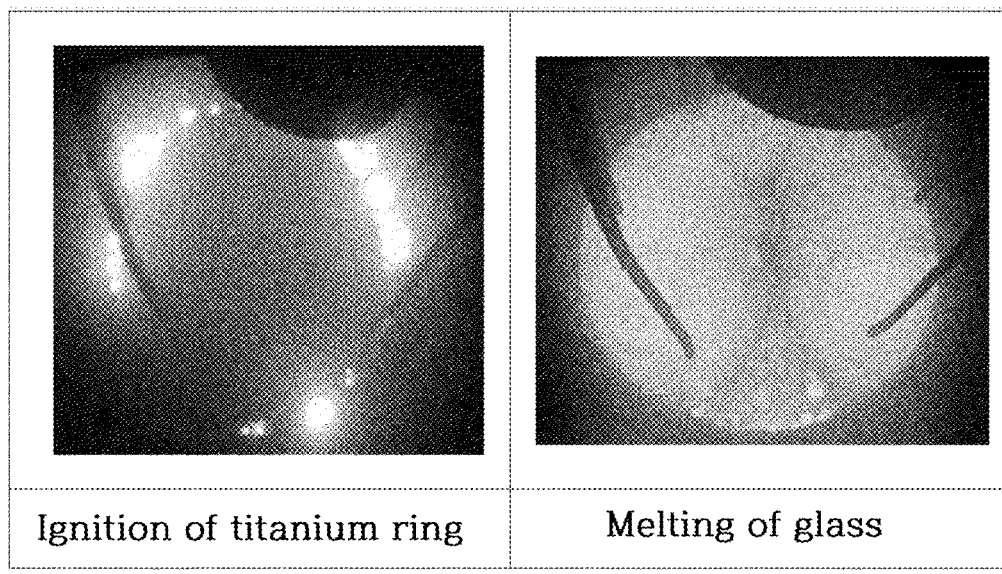
FIG. 7 is a picture showing initial ignition and glass melting.

Experimental Example 2. Pilot Test of Process of Vitrifying Low-Level Radioactive Waste Resin i) Initial Ignition The composition glass developed in Example 2 and Experimental Example 1 was loaded on the bottom of the low-temperature melting furnace in order to melt a target waste product (simulated waste resin). After the glass was loaded in the melting furnace as shown in FIG. 6, a titanium ring was placed on the upper portion, and initial ignition was started, as shown in FIG. 7. The titanium ring started to be heated 30 min after a high-frequency generator maneuvered, and the periphery of the glass started to be melted after about 1 hour. The power of the high-frequency generator was increased to a predetermined value in order to completely melt the ignition glass in the melting furnace, and the amount of bubblers was controlled in order to maintain the integrity of the melting operation. The stable molten glass was maintained and the waste product started to be added 2 hours after an initial maneuver.

ii) Addition and Melting of Waste Product

Figure 8:
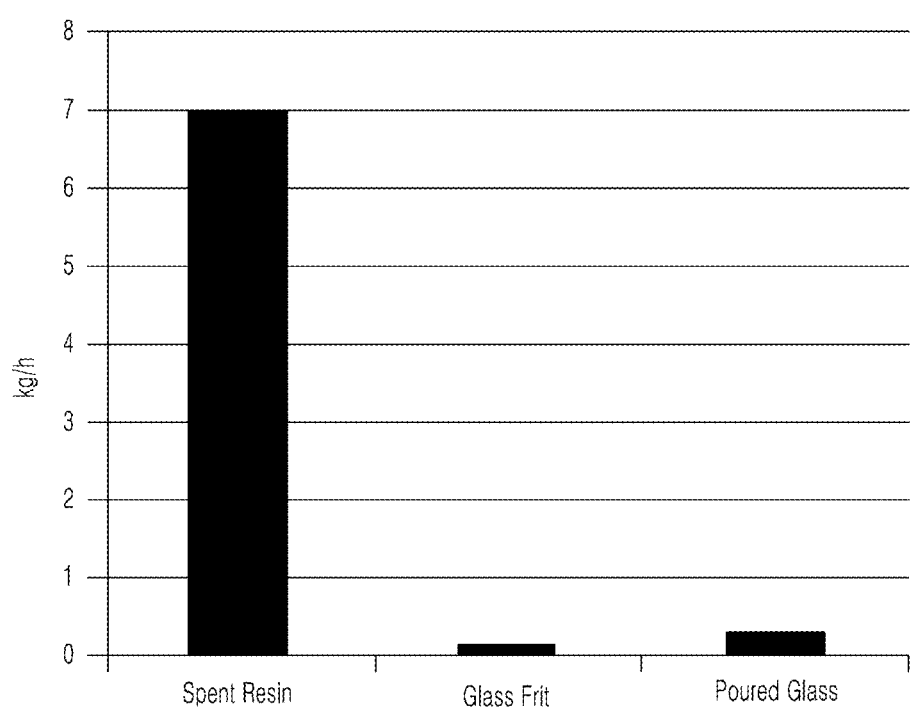
FIG. 8 is a graph showing the addition conditions of a glass frit, a waste resin, and a waste product.

FIG. 8 shows the addition rates of the waste products which are analyzed according to the glass compositions developed in Example 2 and Experimental Example 1, as well as the melting characteristics thereof. When the waste resin was added in an amount of 7 kg per hour, the addition rate of the glass frit was less than 0.134 kg per hour, and the amount of the glass discharged after melting was analyzed to be 0.224 kg/h. When the waste resin was added, the molten substance was in a stable state, and negative pressure was stable in the furnace. However, when the addition amount was large, fumes were partially formed in some cases. Meanwhile, unusual effects (a rapid change in negative pressure, swelling, and the like) of operation of the melting furnace were not observed.

iii) Result of Pilot Test

Figure 9:
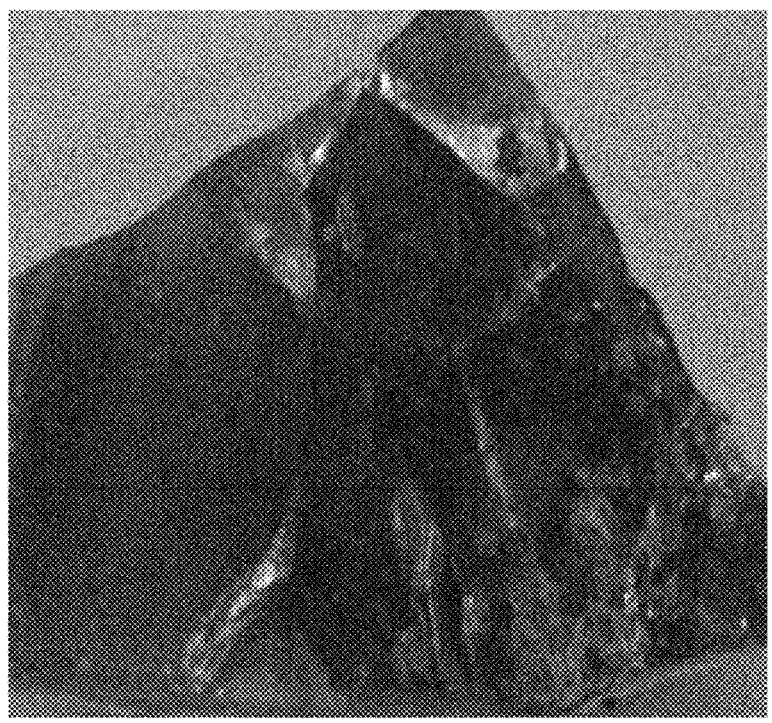
FIG. 9 shows the glass solidified body of the waste resin discharged after a pilot test.

The waste product was smoothly added, and the integrity of the molten glass and the viscosity of the molten substance were favorable. The molten substance was spontaneously smoothly discharged, and the apparent viscosity was 100 poise or less during discharging. Therefore, it was judged that there was no significant problem in vitrifying the waste resin and the waste product. FIG. 9 shows the glass solidified body discharged after the resin is melted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A glass composition for vitrifying a low-level radioactive waste resin, the glass composition comprising:
30 to 40 wt % of $SiO_2$, 6 to 9 wt % of $Al_2O_3$, 9 to 13 wt % of $B_2O_3$, 15 to 22 wt % of CaO, 7 to 9 wt % of $K_2O$, 2 to 5 wt % of MgO, 4 to 9 wt % of $Na_2O$, 3 to 7 wt % of $Li_2O$, and 0.5 to 3 wt % of $MnO_2$.

* * * * *